United States Patent [19]

Moore

[11] 4,196,679
[45] Apr. 8, 1980

[54] DISC OPENER AND ADJUSTABLE SEED TUBE ASSEMBLY

[76] Inventor: Samuel Moore, Newhill House, 33 Kirk Rd., Ballymoney BT53 6PP, Co. Antrim, Ireland

[21] Appl. No.: 849,348

[22] Filed: Nov. 7, 1977

[51] Int. Cl.² ............................................... A01C 5/06
[52] U.S. Cl. .......................................... 111/85; 111/87
[58] Field of Search ...................... 111/88, 87, 86, 84, 111/85

[56] References Cited

U.S. PATENT DOCUMENTS

| 345,403 | 7/1886 | Arnett | 111/88 UX |
| 489,353 | 1/1893 | Webster | 111/84 |
| 805,262 | 11/1905 | Christman | 111/87 |
| 2,341,795 | 2/1944 | Kriegbaum et al. | 111/87 X |
| 2,691,353 | 10/1954 | Secondo | 111/87 X |

FOREIGN PATENT DOCUMENTS

| 204578 | 11/1956 | Australia | 111/86 |
| 1218785 | 1/1971 | United Kingdom | 111/87 |

Primary Examiner—Edgar S. Burr
Assistant Examiner—Steven A. Bratlie
Attorney, Agent, or Firm—Scrivener, Parker, Scrivener and Clarke

[57] ABSTRACT

Apparatus for preparing and seeding ground in which seeds from a seedbox mounted on a frame assembly for connection to a towing vehicle are delivered through seed tubes to slits which are cut and opened in the ground by a plurality of disc mounted on the frame assembly for rotation about generally transverse axes and, at least one roller mounted on the frame assembly in a position rearwardly of the disc for rotation about a transverse axis is adapted to compact the ground and close the slits after seeds have been implanted therein. Each seed tube includes a rigid lower end carrying a coulter for holding open a slot cut by a disc adjacent to which the coulter is located and, the coulter is adjustable with respect to the disc to ensure that the coulter engages in the slit and the seeds are deposited therein.

3 Claims, 3 Drawing Figures

DISC OPENER AND ADJUSTABLE SEED TUBE ASSEMBLY

SPECIFIC DESCRIPTION

This invention relates to agricultural sowing of seeds by the technique of slit sowing in which seeds are implanted in slots or narrow slots cut in the ground, not necessarily cultivated or otherwise prepared except, in suitable cases, where vegetation is killed by the application of suitable chemicals. Essentially my invention is concerned with apparatus for preparing and seeding ground in which seeds from a seedbox mounted on a frame assembly for connection to a towing vehicle are delivered through seed tubes to slits which are cut and opened in the ground by a plurality of discs mounted on the frame assembly for rotation about generally transverse axes, at least one roller mounted on the frame assembly in a position rearwardly of the disc for rotation about a transverse axis is adapted to compact the ground and close the slits after seeds have been implanted therein.

In the Specification of my U.S. Pat. No. 3,611,956 I have claimed apparatus of the kind set forth in which the frame assembly comprises first and second relatively movable frames of which the first frame comprises a draw bar for connection to a towing vehicle and the second forms a mounting for a plurality of spaced substantially parallel longitudinally extending arm assemblies carrying the disc, the arm assemblies being located below the frames and being urged downwardly away from the second frame by resilient means and a resilient connection is provided between the second frame and the draw bar by adjustment of which the loading in the apparatus applied to the disc can be varied to control penetration of the disc into the ground and the depth of the slits thus produced.

According to my present invention in apparatus of the kind set forth each seed tube includes a rigid lower end carrying a coulter for holding open a slit cut by a disc adjacent to which the coulter is located, and the coulter is adjustable with respect to the disc to ensure that the coulter engages in the slit and the seeds are deposited therein.

Conveniently the lower end of the seed tube and the coulter comprise a coulter tube sub-assembly which is adjustable radially with respect to the disc, and angularly about an axis coinciding with the longitudinal axis of the rigid lower end.

Preferably each coulter tube sub-assembly is combined in an assembly with a disc and the disc is journalled for rotation in a mounting plate for attachment to an arm assembly. This has the advantage that the assembly so formed can be removed easily for replacement and maintenance and the plate can be attached to the arm assembly at any convenient position in its length.

One embodiment of our invention is illustrated in the accompanying drawings in which.

Figure 1:
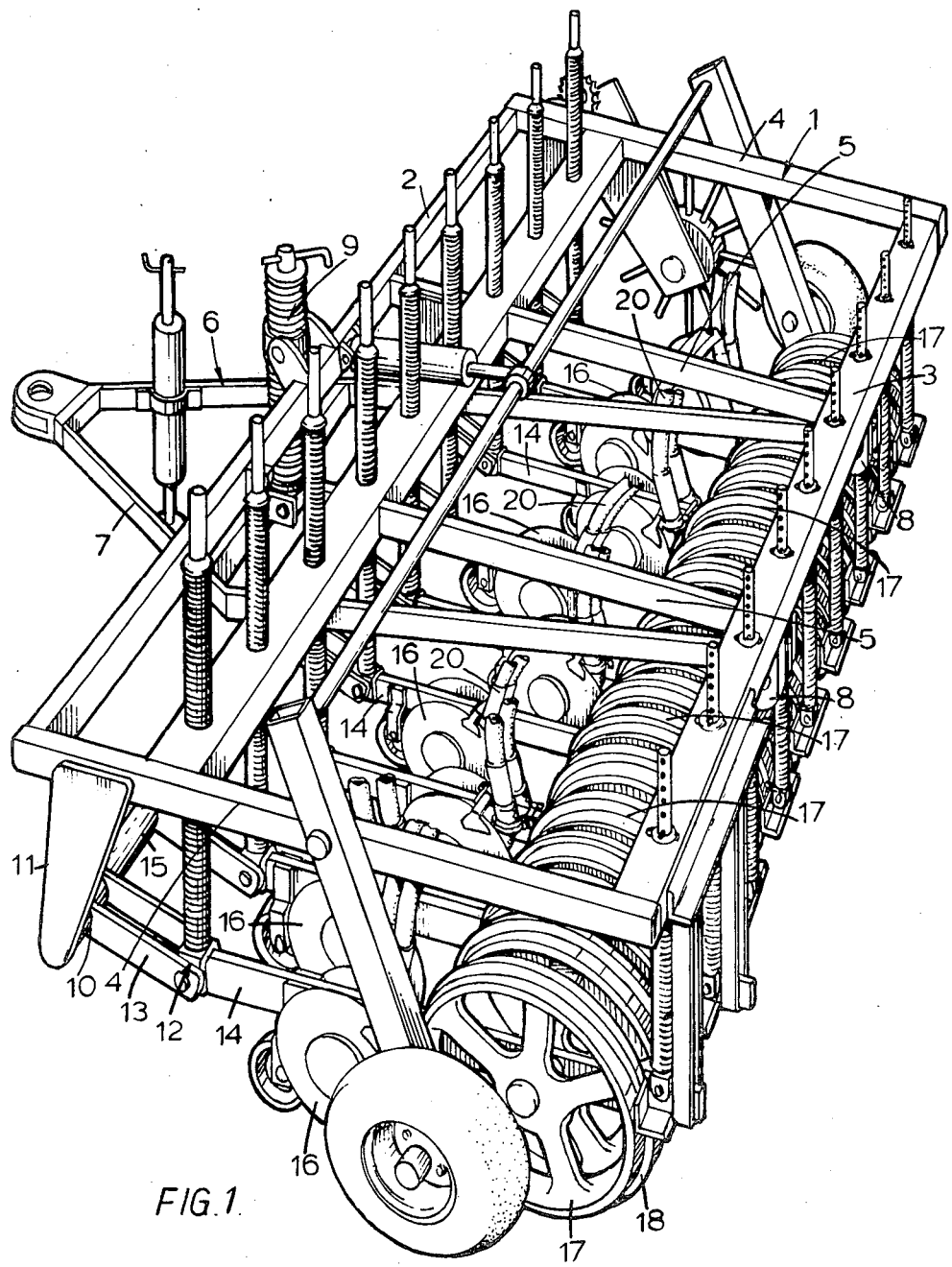
FIG. 1 is a perspective view of apparatus for preparing and seeding ground with a seed box and fertilizer box omitted for clarity.
Figure 2:
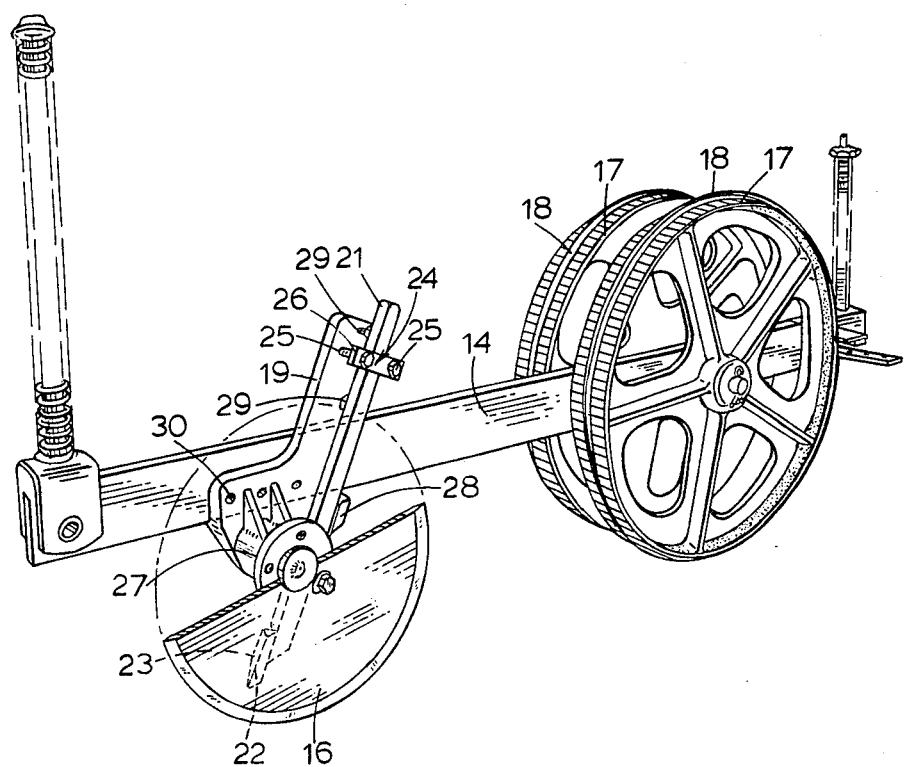
FIG. 2 is a perspective view of an arm assembly incorporated in the apparatus of FIG. 1.
Figure 3:
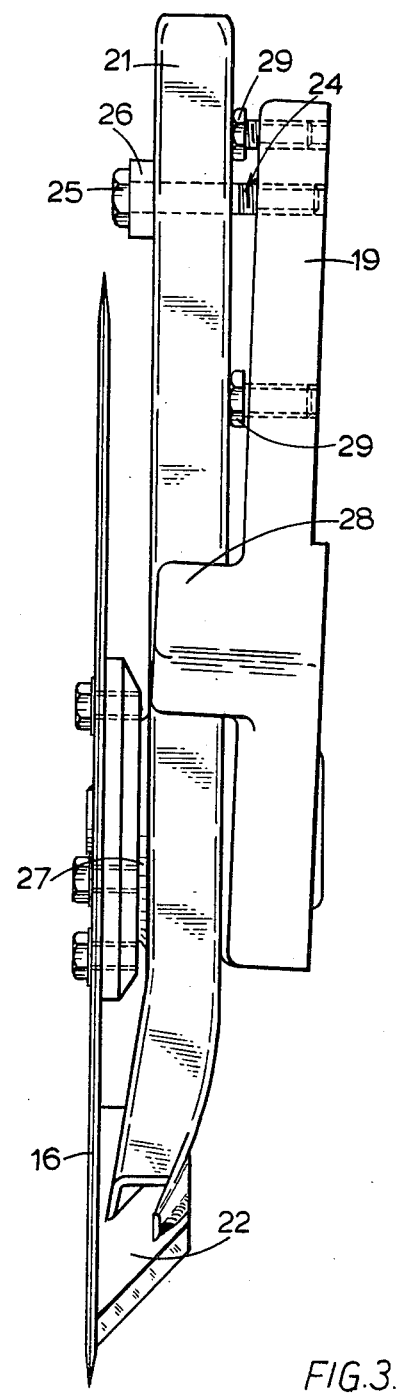
FIG. 3 is an end elevation of the coulter tube sub-assembly and disc of FIG. 2.

The apparatus illustrated in the drawings comprises a first frame 1 of rectangular outline which is oblong in a transverse direction and which comprises spaced parallel front and rear members 2 and 3 which are interconnected by longitudinally extending side members 4 and intermediate bracing members 5. A second frame 6 in the form of a draw-bar 7 of substantially wishbone outline is pivotally connected at the free ends of its limbs to a pair of spaced brackets 8 which depend downwardly from the rear member 3. The front member 2 is connected to the frame 6 by means of a spring-loaded strut assembly 9, which is adjustable normally to alter the relative angular positions of the frames 1 and 6.

A transverse shaft 10 is journalled in a plurality of transversely spaced brackets 11 which depend downwardly from the side members 4 and the bracing members 5 adjacent to the front member 2. A plurality of spaced longitudinal arm assemblies 12, each comprising a pair of arms 13 amd 14 pivotally connected at adjacent ends, are journalled at their forward ends on the shaft 10. Adjacent arm assemblies 12 are spaced from each other by distance pieces 15 carried by the shaft 10.

Each arm 14, at an intermediate point in its length provides a mounting for a pair of cutting discs 16, and a pair of ground compacting rollers 17 are rotatably mounted on opposite sides of each arm in a position rearwardly of the cutting discs 16 mounted on that arm to pass over and close the slit cut in the ground by a corresponding disc. Each roller 17 is formed with a central peripheral rib 18 to facilitate closure of a slit made by a corresponding disc.

Mounting plates 19 are clamped by bolts against each side of each of the arms 14. each mounting plate 19 projects above a respective arm 14 with respect to which it is inclined rearwardly. Also each plate 19 projects below the arm 14 to provide a housing 20 for taper roller bearings in which a respective disc 16 is journalled for rotation.

Seeds are conveyed to slits cut by the discs 16 by means of seed tubes 20 of which one tube is provided for each disc 16. Each seed tube 20 includes a rigid tubular lower end portion 21 of generally square cross section which carries at its lower end a coulter 22 with which the tubular portion forms a coulter tube sub-assembly. The coulter 22 is of generally triangular outline with a leading edge 23 being inclined rearwardly with respect to the plane of the disc 16. The sub-assembly is carried from the arm 14 by means of a clamp 24 comprising spaced clamp bolts 25 which are passed through openings in a clamp plate 26 and are screwed into tapped holes in the mounting plate 19 for attachment to an arm at any convenient position in the length of the arm. The clamp plate 26 is secured to the portion of the mounting plate 19 which projects above the arm 14.

In assembly the tubular end portion 21 is passed into the clamp between an abutment 27 surrounding a stub axle for the disc and a projection 28 on the mounting plate 19 to the rear of the stub axle which acts as a stop, and the clamp bolts 25 are then tightened to urge the tubular end portion 21 into engagement with the heads of a pair of fulcrum pins 29 which are screwed into tapped holes in the mounting plate 19 disposed relatively above and below the clamp bolts.

By releasing the clamp 24 and adjusting the effective length of the fulcrum pins 29 the sub-assembly can be adjusted in a generally radial direction with respect to the disc 16 to vary the penetration into the ground of the coulter 22 relative to the depth of penetration of the disc. Similarly by adjusting the relative positions of the two clamp bolts 25 the tubular end portion 21 and in consequence the sub-assembly itself can be moved angularly about the fulcrum pins 29 as a pivot and the main longitudinal axis of the tubular portion to vary the angle of inclination of the coulter 22 with respect to the disc 16.

The assemblies comprising discs 16 and coulter tube sub-assemblies can be mounted on the arms 14 in any convenient aligned or staggered relationship, and are readily replaceable by unscrewable bolts passing through openings 30 in the mounting plate 19 into tapped holes in the arms.

I claim:

1. Apparatus for preparing and seeding ground comprising a frame assembly, a seed box mounted on said frame assembly, said frame assembly comprising a plurality of spaced longitudinal arms, seeding assemblies detachably mounted on said arms, each of said seeding assemblies comprising a mounting plate having a lower end projecting below said arm, means for detachably connecting said mounting plate to said arm, a disc for cutting a slit in the ground journalled in said lower end of said plate for rotation about a generally transverse axis, a seed tube for delivering seeds from said seed box to said slit, each seed tube comprising a rigid tubular lower end portion having an upper end and a lower end, a coulter carried by said lower end of said lower end portion for holding open a slit cut by said disc, a connection between said upper end of said lower end portion and said seed box, an adjustable mounting means for detachably mounting said lower end portion on said mounting plate for adjustment in a radial direction with respect to said disc and angularly about an axis coinciding with the longitudinal axis of said lower end portion whereby the position of said coulter can be adjusted with respect to said disc to ensure that said coulter engages in the slit and the seeds are deposited therein, and at least one roller mounted on said frame assembly in a position rearwardly of said seeding assemblies to compact the ground and close slits after seeds have been implanted therein, wherein said lower end portion is carried from said arm by a clamp secured to said mounting plate, and said lower end portion is located between spaced abutments on said plate, one of said abutments surrounding a stub axle for said disc and the other of said abutments comprising a projection which is spaced rearwardly from said stub axle, said clamp being releasable to permit said lower end portion to be adjusted in said radial direction with respect to said disc, and wherein said clamp comprises a pair of clamp bolts which are passed through openings in a clamp plate for engagement with a face of said lower end portion opposite said mounting plate and which are connected to said mounting plate, and a face of said lower end portion engages the opposite side of said clamp plate with a pair of fulcrum pins mounted in said mounting plate, and said clamp blots and said fulcrum pins being adjustable with respect to said mounting plate to vary the angle of inclination of said coulter with respect to said disc.

2. Apparatus as claimed in claim 1, in which said clamp bolts and said fulcrum pins are all screwed into tapped holes in said mounting plate.

3. Apparatus as claimed in claim 1, wherein said mounting plates are adapted for mounting said seeding assemblies in any convenient position along the length of said arms.

* * * * *